US004001734B2

United States Statutory Invention Registration [19]

[11] Reg. Number: H1734

Masse

[45] Published: Jun. 2, 1998

[54] PROCESS FOR MAKING CURED FOAMED ARTICLES FROM EPOXIDIZED DIENE POLYMERS

[75] Inventor: Michael Alan Masse, Richmond, Tex.

[73] Assignee: Shell Oil Company, Houston, Tex.

[21] Appl. No.: 821,184

[22] Filed: Mar. 19, 1997

Related U.S. Application Data

[60] Provisional application No. 60/013,735 Mar. 20, 1996.

[51] Int. Cl.[6] ..... C08J 9/00

[52] U.S. Cl. ..... 521/128

[58] Field of Search ..... 521/128, 129; 525/332.9, 333.3

[56] References Cited

U.S. PATENT DOCUMENTS 4,090,986 5/1978 Gormley et al. ..... 521/128

5,229,464 7/1993 Erichson et al. ..... 525/314

*Primary Examiner*—Charles T. Jordan
*Assistant Examiner*—Meena Chelliah

[57] ABSTRACT

A process for curing and foaming epoxidized diene polymers which comprises contacting the polymer with a non-aromatic anhydride curing agent at an epoxy/anhydride molar ratio from 0.6 to 1.4 and from 2 to 10 phr of an accelerator at a temperature of from 100° to 200° C. for a period of 10 minutes to six hours.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MAKING CURED FOAMED ARTICLES FROM EPOXIDIZED DIENE POLYMERS

CROSS REFERENCE TO RELATED APPLICATIONS

This application claims the benefit of U.S. Provisional application Ser. No. 60/013,735, filed Mar. 20, 1996.

FIELD OF THE INVENTION

This invention relates to the chemical curing of epoxidized diene polymers. More particularly, the present invention relates to the use of nonaromatic anhydride curing/foaming agents to make a cured foamed article.

BACKGROUND OF THE INVENTION

The chemical curing of epoxidized diene polymers is of interest for sealant, coatings, and adhesives applications. U.S. Pat. No. 5,229,464 describes low molecular weight epoxidized diene block copolymers and states that they may be crosslinked by the addition of multifunctional carboxylic acids and acid anhydrides. U.S. Pat. Nos. 5,478,885 and 5,461,112 describe similar polymers which are used as toughening modifiers for epoxy resins. These epoxidized diene polymers are shown to be curable with carboxylic acid or anhydride curing agents. In this latter application, partially and fully saturated aliphatic carboxylic acids or anhydrides have been found to be very useful and to allow the production of rigid, strong resins having enhanced toughness. Typically, one mole of anhydride or dicarboxylic acid is used for every mole of epoxy functionality.

I have discovered that when such carboxylic acid anhydrides are used to cure these epoxidized diene polymers alone, especially in combination with amine or imidazole accelerating agents, bubbles form in the crosslinked product. It has been found that the bubbles are produced as a result of the evolution of carbon dioxide during the decarboxylation of the anhydride. This side reaction competes with the crosslinking reaction and the kinetics are such that it takes up enough of the anhydride groups to produce a significant volume of $CO_2$ bubbles in the product. The primary crosslinking reaction occurs simultaneously. The resulting action of the anhydride or carboxylic acid is to both generate a foaming gas and to crosslink the polymer.

I have found that when the amount of amine or imidazole accelerator used is increased approximately two to ten fold from its range of use in the aforementioned curing operation, the evolution of carbon dioxide and thus the bubbles dramatically increases. This causes sufficient foaming in the polymer product to produce a good quality cured foamed article from the epoxidized diene polymer. These foamed products have good adhesion to glass and range in physical character from soft, tacky foams to rigid, nontacky foams.

SUMMARY OF THE INVENTION

This invention is a method for chemically curing and foaming epoxidized diene polymers. Further, the invention is a method of producing a foam wherein the curing agent acts both as a crosslinker and a blowing agent. The method involves curing said epoxidized diene polymers with partially or fully saturated nonaromatic carboxylic acid anhydrides. The anhydride curing agent is used in a 0.6 to 1.4 molar ratio with the epoxy functionality. The curing process generally takes place at elevated temperatures, 100° to 200° C., for a period of 10 minutes to 6 hours and is often referred to as "bake cure." The preferred nonaromatic carboxylic acid anhydride curing agents for use in the present invention are methyltetrahydrophthalic anhydride, hexahydrophthalic anhydride, and dodecenylhydrophthalic anhydride. The anhydride bake cures are accelerated by using an amine or imidazole curing accelerator which is used in an amount of 2 to 10 parts by weight (pbw) per 100 parts by weight of the polymer.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, preferably lithium, their alkyls, amides, silanolates, napthalides, biphenyls or anthracenyl derivatives. The polydienes are synthesized by anionic polymerization of conjugated diene hydrocarbons with these lithium initiators. This process is well known as described in U.S. Pat. Nos. 4,039,593 and Re. 27,145 which descriptions are incorporated herein by reference. Polymerization commences with a monolithium initiator which builds a living polymer backbone at each lithium site. Specific processes for making the preferred polymers for use herein are described in detail in copending, commonly assigned application Ser. No. 08/320,807 filed Oct. 11, 1994, entitled "Monohydroxylated Diene Polymers and Epoxidized Derivatives Thereof" and U.S. Pat. No. 5,461,112 which are herein incorporated by reference.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

Epoxidized polymers which may be cured in accordance with the present invention are those described in U.S. Pat. Nos. 5,229,464, 5,247,026, 5,478,885, and 5,461,112, which are all herein incorporated by reference. For instance, the following block copolymers containing from 0.1 to 7.0 milliequivalents (meq) of epoxy per gram of polymer may be used:

$$(A—B—A_p)_n—Y_r—(A_q—B)_m$$

wherein Y is a coupling agent, coupling monomers or an initiator, and wherein A and B are polymer blocks which may be homopolymer blocks of conjugated diolefin monomers, copolymer blocks of conjugated diolefin monomers or copolymer blocks of conjugated diolefin monomers and monoalkenyl aromatic hydrocarbon monomers, and wherein the A blocks have a greater number of di-, tri- and tetra-substituted unsaturation sites per unit of block mass than do the B blocks, and wherein the A blocks have a weight average molecular weight from about 100 to about 3000 and the B blocks have a weight average molecular weight from about 1000 to about 15,000, and wherein p and q are 0 or 1 and n>0, r is 0 or 1, m≧0, and n+m ranges from 1 to 100.

The most highly preferred polymers for use herein are epoxidized diblock polymers which fall within the scope of the formula:

$$(HO)_x—A—S_z—B—(OH)_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a weight average molecular weight of from 100 to 6000, preferably 500 to 4,000, and most preferably 1000 to 3000, and the B blocks have a weight average molecular weight of from 1000 to 15,000, preferably 2000 to 10,000, and most preferably 3000 to 6000. S is a vinyl aromatic hydrocarbon block which may have a molecular weight of from 100 to 10,000. x and y are 0 or 1, but only one at a time can be1. z is 0 or1.

The overall weight average molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I—B—OH I—B/S—OH I/S—B—OH I—I/B—OH or

B/I—B/S—OH B—B/S—OH I—EB—OH I—EB/S—OH or

I—S/EB—OH I/S—EB—OH HO—I—S/B HO—I—S/EB where EB is hydrogenated butadiene, —EB/S—OH means that the hydroxyl source is attached to a styrene mer, and —S/EB—OH signifies that the hydroxyl source is attached to a hydrogenated butadiene mer. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. Polymers containing no terminal hydroxyl functionality so that both x and y equal 0 are also useful in the present invention.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight acid such as formic acid. These and other methods are described in more detail in U.S. Pat. Nos. 5,229,464, 5,247,026, 5,478,885, and 5,461,112, which are herein incorporated by reference. The epoxidized polymers of this invention may contain from 0.1 to 7.0 meq of epoxy per gram of polymer depending upon the desired end use for the product.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average, but for monodisperse polymers, all three are very similar. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the absolute molecular weight of a polymer is not as straightforward or as easy to make using GPC. A good method to use for absolute molecular weight determination is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers will have different diene blocks and these diene blocks may be selectively hydrogenated as described in U.S. Pat. No. 5,229,464 which is also herein incorporated by reference.

U.S. Pat. Nos. 5,478,885 and 5,461,112 describe anhydride curing agents as commonly used to cure the epoxidized diene polymers described above. Anhydrides are used herein because a bake cure system is desired. Amine curing agents, which work well in compositions containing epoxy resins as described in said patent, will not cure epoxidized diene polymers. The anhydride curing agents described as useful in said patents may be any compound containing one or more anhydride functional groups and specific examples given include phthalic anhydride, substituted phthalic anhydrides, hydrophthalic anhydrides (which are not aromatic compounds because they are hydrogenated), substituted hydrophthalic anhydrides, succinic anhydride, substituted succinic anhydrides, halogenated anhydrides, multifunctional carboxylic acids, and polycarboxylic acids.

Because of their ease of handling, saturated or partially saturated anhydrides, such as hydrophthalic anhydrides and substituted hydrophthalic anhydrides, are regularly used in this type of curing. I have found that, unknown to those skilled in the art, these and other nonaromatic anhydrides have secondary effects when used to cure epoxidized diene polymers in high concentration. Sufficient carbon dioxide is generated during the reaction of the accelerator and the curing agent to form enough bubbles in the cured product to provide a foam. Non aromatic carboxylic acid anhydride curing agents are useful in the present invention. Preferred curing agents are the substituted and unsubstituted hydrophthalic anhydrides. The most preferred curing agents are methyltetrahydrophthalic anhydride, hexahydrophthalic anhydride, and dodecenylhydrophthalic anhydride.

I have found that it is necessary to use an anhydride curing agent which is nonaromatic in nature to achieve a good bake cure with the formation of sufficient bubbles in the product. Carbon dioxide is not generated in the reaction of an epoxidized diene polymer and an aromatic anhydride curing agent. According to my invention, the nonaromatic anhydride is combined with the epoxidized diene polymer such that a suitable epoxy/anhydride molar ratio is achieved. This ratio should range from 0.6 to 1.4, preferably 0.8 to 1.2, and most preferably about 1.0, to achieve sufficient crosslinking and foaming to produce a product with desirable foam characteristics. The crosslinking occurs through the epoxy groups and aromatic anhydride such that nonaromatic ester linkages are formed. Typically, the anhydride cures are conducted at elevated temperatures—temperatures of from 100°to 200° C. are possible but 130° to 180° C. is the preferred operating range—for a period of 10 minutes to 6 hours, and are often referred to as "bake cures."

The anhydride bake cures are accelerated by using a curing accelerator. Suitable curing accelerators include trialkyl amines, hydroxyl-containing compounds and imidazoles. Benzyldimethylamine (BDMA), and 2-ethyl-4-methylimidazole (EMI) have been found to work well in curing the blends of the present invention. The accelerator is used in an amount of 1 to 10, preferably about 10 parts of accelerator per 100 parts of polymer.

The crosslinked materials of the present invention are useful in adhesives (including pressure sensitive adhesives, contact adhesives, laminating adhesives, assembly adhesives and structural adhesives), sealants, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and the nonaromatic anhydride curing agent. This is especially true for sealants and structural adhesives. However, in applications such as pressure sensitive adhesives, suitable formulations would also contain various combinations of resins, plasticizers, fillers, solvents, stabilizers and other ingredients such as asphalt. The following are some typical examples of formulating ingredients for adhesives and sealants.

In adhesive applications, as well as in sealants, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Saturated resins may also be employed as reinforcing agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins. Examples of such reinforcing resins useful in the present invention are the hydrogenated Regalrez® and Regalite® resins from Hercules. Preferably, they are used in amounts from 1 to 50 percent by weight of the total composition.

Other resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

Reactive co-curing components such as epoxy resins and epoxidized natural products are also useful as reinforcing agents. Examples of useful epoxy resins are aromatic resins such as EPON® 828 resin from Shell and aliphatic resins such as EPONEX® 1510 resin from Shell and UVR 6110 resin from Union Carbide. Examples of useful epoxidized or epoxy-containing natural products are the DRAPEX® series of epoxidized oils from Witco and naturally occurring vernonia oil.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. Reactive compounds can be used as plasticizers. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition. Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

Various types of fillers and pigments can be included in the formulation. This is especially true for exterior sealants in which fillers are added not only to create the desired appeal but also to improve the performance of the sealants such as its weatherability. A wide variety of fillers can be used. Suitable fillers include calcium carbonate, clays, talcs, silica, zinc oxide, titanium dioxide and the like. The amount of filler usually is in the range of 0 to about 65%w based on the solvent free portion of the formulation depending on the type of filler used and the application for which the sealant is intended. An especially preferred filler is titanium dioxide.

All adhesive and sealant compositions based on the epoxidized polymers of this invention will contain some combination of the various formulating ingredients disclosed herein. No definite rules can be offered about which ingredients will be used.

The skilled formulator will choose particular types of ingredients and adjust their concentrations to give exactly the combination of properties needed in the composition for any specific adhesive or sealant application.

The only three ingredients that will always be used in any adhesive, coating or sealant are the epoxidized polymer, the curing agent, and the accelerator. Beyond these three ingredients, the formulator will choose to use or not to use among the various resins, fillers and pigments, plasticizers, reactive oligomers, reactive and nonreactive diluents, stabilizers, and solvents.

Adhesives are frequently thin layers of sticky compositions which are used in protected environments (adhering two substrates together). Therefore, unhydrogenated epoxidized polymers will usually have adequate stability so resin type and concentration will be selected for maximum stickiness without great concern for stability, and pigments will usually not be used.

Sealants are gap fillers. Therefore, they are used in fairly thick layers to fill the space between two substrates. Since the two substrates frequently move relative to each other, sealants are usually low modulus compositions capable of withstanding this movement. Further, they generally have good adhesion to the substrates. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage. The present invention is seen to produce a particularly good sealant, the foaming character of such sealants will enhance their gap filling ability.

A formulator skilled in the art will see tremendous versatility in the epoxidized polymers of this invention to prepare adhesives, coatings and sealants having properties suitable for many different applications.

The adhesive and sealant compositions of the present invention can be prepared by mixing the components together until a homogeneous blend is obtained. Various methods of blending are known to the art and any method that produces a homogenous blend is satisfactory. Frequently, the components can be blended together using solvent to control viscosity. Suitable solvents include common hydrocarbons, esters, ethers, ketones and alcohols as well as mixtures thereof. If solvent content is restricted or in solvent-free compositions, it may be possible to heat the components to help reduce viscosity during mixing and application.

A preferred use of the present formulation is in weatherable bake-cured sealants. The sealant comprises a monohydroxylated epoxidized diene polymer, an acid anhydride curing agent, an optional curing accelerator, an optional reinforcing resin or co-curing agent, and an optional tackifying resin. Alternatively, when the amount of tackifying resin is zero, the compositions of the present invention may be used for adhesives that do not tear paper and molded goods and the like.

Sealant compositions of this invention can be used for many applications. Particularly preferred is their use as gap fillers for constructions which will be baked (for example, in a paint baking oven) after the sealant is applied. This would include their use in automobile manufacture and in appliance manufacture. Another preferred application is their use in gasketing materials, for example, in lids for food and beverage containers.

EXAMPLE

One formulation each were made with polymers 206 and 112. Polymer 206 is a linear saturated I—S/EB—OH block copolymer having 42 percent styrene, an epoxy equivalent weight of 670 g/eq epoxy, a hydroxyl equivalent weight of 6000 g/eq hydroxyl, and a number average molecular weight of 6000. Polymer 112 was a linear unsaturated I—B block copolymer having an epoxy equivalent weight of 208 g/eq epoxy, a butadiene to isoprene ratio of 19, and a number average molecular weight of 5,400.

Formulations 1 and 2 below were used in this example. MTHPA is methyl tetrahydrophthalic anhydride, the curing agent, and EMI is 2-ethyl-4-methyl imidazole, the accelerator.

| Formulation 1 | | Formulation 2 | |
|---|---|---|---|
| Polymer 206 | 100 grams | Polymer 12 | 100 grams |
| MTHPA | 24.2 grams | MTHPA | 81.3 grams |
| EMI | 9.1 grams | EMI | 30.6 grams |

These formulations were mixed at 100° to 120° C. and then placed in 6" diameter fiber tube and cured at 150° C. for two hours. The polymer 206 formulation resulted in a brown foam. The foam was soft and flexible and had a slightly tacky surface. The polymer 112 formulation produced a rigid, nontacky foam. Both cured foams exhibited good adhesion to the fiber container.

Portions of both formulations were also cured at 150° C. for two hours in glass containers. The cured foams exhibited good adhesion to glass.

I claim:

1. A process of making a cured foamed article from an epoxidized diene polymer which comprises contacting the polymer with a partially or fully saturated nonaromatic anhydride curing agent at an epoxy/anhydride molar ratio of from 0.6 to 1.4 and from 2 to 10 pbw of an accelerator at a temperature of from 100° to 200° C. for a period of 10 minutes to 6 hours.

2. The process of claim 1 wherein the curing agent is selected from the group consisting of substituted and non-substituted hydrophthalic anhydrides.

3. The process of claim 2 wherein the curing agent is selected from the group consisting of methyltetrahydrophthalic anhydride, hexahydrophthalic anhydride, and dodecenylphthalic anhydride.

4. The process of claim 1 where the structure of the epoxidized polydiene is $(HO)_x—A—S_z—B—(OH)_y$ wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers.

5. The process of claim 4 where x=0, y=1, z=0, and block B is comprised of styrene and butadiene and block A is comprised of isoprene.

6. The process of claim 4 where x=0, y=0, z=0, and block B is comprised of butadiene and block A is comprised of isoprene.

7. The process of claim 1 wherein the epoxidized diene polymer contains from 0.1 to 7.0 meq/g of epoxy per gram of polymer.

8. The process of claim 1 wherein the accelerator is selected from the group consisting of 2-ethyl-4-methyl-imidazole and benzyl-dimethyl-amine.

9. The process of claim 1 wherein the temperature ranges from 130° C. to 160° C.

10. A foamed article from an epoxidized diene polymer produced by the process of claim 1.

11. A crosslinked epoxidized polydiene polymer wherein the crosslinking in the polymer is through nonaromatic ester linkages and the polymer contains from 0.1 to 7.0 meq per gram of original epoxidized polymer of said ester linkages.

12. A pressure sensitive adhesive composition comprising the crosslinked polymer of claim 10 and a tackifying resin.

13. A sealant composition comprising the crosslinked polymer of claim 11.

14. A structural adhesive composition comprising the crosslinked polymer of claim 11.

* * * * *